United States Patent Office 3,576,904
Patented Apr. 27, 1971

3,576,904
BLENDS OF ORGANOSILOXANE GUMS AND BLOCK COPOLYMERS OF POLYVINYL AROMATICS AND POLYDIMETHYLSILOXANES
John C. Saam and Charles W. Lentz, Midland, Mich., assignors to Dow Corning Corporation, Midland, Mich.
No Drawing. Filed Mar. 10, 1969, Ser. No. 805,791
Int. Cl. C08g 47/06
U.S. Cl. 260—825
15 Claims

ABSTRACT OF THE DISCLOSURE

Blends of organosiloxane gums and a block copolymer of two blocks where one block is a vinyl aromatic polymer and the other block is polydimethylsiloxane are disclosed The block copolymers are present in amounts of 15 to 150 parts by weight per 100 parts by weight of the organosiloxane gum. These blends when cured to elastomers have improved physical properties over the cured unfilled organosiloxane gums. These blends cure to useful elastomers.

---

This invention relates to a blend of an organosiloxane gum and a block copolymer of a vinyl aromatic polymer block and a polydimethylsiloxane block.

Organosiloxane gums are curable to rubbery materials. However, most organosiloxane gums are not useful when cured, since they lack strength and toughness. It has been found that by adding reinforcing fillers, such as silica, to the organosiloxane gums acceptable and useful physical properties could be obtained. Thus, most of the prior art teaching silicone elastomers describe mixing the organosiloxane gums with silica fillers to achieve useful physical properties.

It is totally unexpected that by blending a block copolymer of a vinyl aromatic polymer block and a polydimethylsiloxane block that the cured product would have physical properties which would be improved in the manner of using a reinforcing silica filler.

An object of this invention is therefore to provide a blend of an organosiloxane gum and a block copolymer having a vinyl aromatic polymer block and a polydimethylsiloxane block. This object and others will become more apparent from the following detailed description of the present invention.

The present invention relates to a blend consisting essentially of (A) 100 parts by weight of a polydiorganosiloxane gum having an average unit formula $$R_a{}^3SiO_{\frac{4-a}{2}}$$

wherein each $R^3$ is a monovalent radical selected from the group consisting of a methyl radical, a vinyl radical, a phenyl radical, an ethyl radical and a 3,3,3-trifluoropropyl radical, and $a$ has an average value of from 1.98 to 2.005 inclusive, at least 90 percent of the total $R^3$ groups being methyl radicals, and molecules of said polydiorganosiloxane gum being terminated by a group selected from the group consisting of silanols, alkoxys and $R_3{}^3SiO_{0.5}$ where $R^3$ is defined above, and (B) 15 to 150 parts by weight of a block copolymer consisting essentially of an aromatic containing organic block and a silicon containing block and represented by a formula

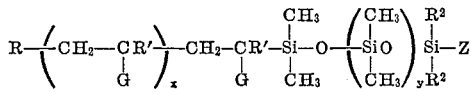

in which

R is a monovalent hydrocarbon radical having from 1 to 30 inclusive carbon atoms, R' is a monovalent radical selected from the group consisting of a hydrogen atom and a methyl radical, each $R^2$ is a monovalent hydrocarbon radical having from 1 to 18 inclusive carbon atoms, Z is a monovalent radical selected from the group consisting of $R^2$ radicals and hydroxyl radicals, G is a monovalent aromatic radical consisting of from 1 to 3 benzenoid rings in which the benzenoid rings have up to 3 aliphatic organic substituents each of no more than six carbon atoms selected from the group consisting of alkyl radicals, cycloalkyl radicals and alkoxy radicals and in G no aliphatic organic substituent which is ortho to the

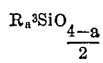

group has more than one carbon atom,
$x$ has an average value of from 20 to 5000 inclusive, and
$y$ has an average value of from 20 to 5000 inclusive, said block copolymer having a molecular weight of from 7000 to 1,000,000 inclusive, 20 to 70 weight percent being silicon containing units and 30 to 80 weight percent being units of the organic block.

The block copolymers suitable for use in the blends of the present invention are best prepared by polymerizing a vinyl aromatic compound, $CH_2=CR'G$, with an organolithium compound in a solvent solution. The amount of organolithium compound used per amount of vinyl aromatic compound will determine the size of the organic block. The smaller the amount of organolithium compound per given amount of vinyl aromatic compound, the greater the number of vinyl aromatic units in the resulting polymer. The reaction between the organolithium compound and the vinyl aromatic compound should be carried out under conditions free from contaminations, such as water, air, oxygen, inhibitors, acidic impurities, greases and the like. The mixture of the vinyl aromatic compound and the organolithium compound in solvent solution are maintained at a temperature below the reflux temperature of the mixture and above the freezing point of the mixture until the $CH_2=CR'G$ has polymerized. The reaction product from the reaction of the organolithium compound and the vinyl aromatic compound is a lithium terminated polymer of the following formula

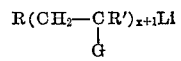

where R, R', G and $x$ are defined above.

To the lithium terminated polymer solution, hexamethylcyclotrisiloxane in solvent solution is added in an amount sufficient to provide at least one hexamethylcyclotrisiloxane molecule with each lithium end, but the amount of hexamethylcyclotrisiloxane should not exceed 40 percent of the total amount of hexamethylcyclotrisiloxane to be added. The addition should be carried out so that there is no exposure of any of the solutions to previously stated impurities. The resulting product would be, for the most part, a polymer of the formula

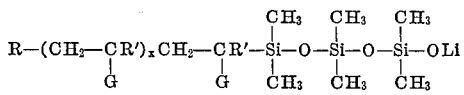

where R, R', G and $x$ are defined above. The reaction is held at a temperature between −50° C. and no greater than the reflux temperature of the mixture. After sufficient time has elapsed, which is at least 30 minutes, preferably 1 to 4 hours, and which is recognizable by the disappearance of the color characteristic for lithium ended polymers, additional hexamethylcyclotrisiloxane in solvent solution and a polymerization promoter preferably in an amount of at least one weight percent based on the weight of the mixture is added to the lithium ended silicon containing copolymer. The amount of hexamethylcyclotrisiloxane is added to provide the desired siloxane block size. The reaction mixture is preferably heated to reflux for 3 to 4 hours to increase the reaction rate. The reaction, however, can be carried out between —50° C. and the reflux temperature of the mixture for at least 30 minutes or greater. The resulting product has a formula

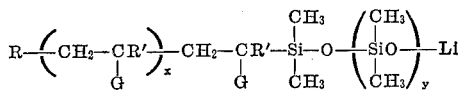

where R, R', G, $x$ and $y$ are defined above. This block copolymer is then terminated by adding acetic acid to give a hydroxyl ended block copolymer or a triorganosilane, $ZR_2{}^2SiCl$, can be added to give a $—SiR_2{}^2Z$ ended block copolymer. The amount of terminating agent is at least sufficient to provide one mole of terminating agent per mole of lithium atom.

The vinyl aromatic compounds suitable for preparing the block copolymers of the present invention include an aromatic compound containing 1 to 3 benzenoid rings having a

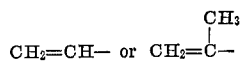

group attached to a benzenoid ring. The benzenoid rings can contain up to three substituents which include alkyl radicals, cycloalkyl radicals and alkoxy radicals. The alkyl, cycloalkyl and alkoxy radicals contain no more than six carbon atoms and any substituent which is ortho to the

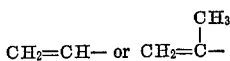

group contains no more than one carbon atom, thus a methyl radical or a methoxy radical. Examples of suitable, vinyl aromatic compounds include, styrene, alphamethylstyrene, o-vinyltoluene, m-vinyltoluene, p-vinyltoluene, o-methoxystyrene, m-methoxystyrene, p-methoxystyrene, 9-vinylanthracene, 4-phenylstyrene, 3,5-diphenylstyrene, 3-methyl-5-hexylstyrene, 4-cyclohexylstyrene, 1-vinylnaphthalene, 2-vinylnaphthalene, 3,4-diphenoxystyrene, 4-hexoxystyrene, 2-methyl-4-hexoxystyrene, 4,5-dimethyl-1-vinylnaphthalene, 3,5-diethylstyrene, 6-phenyl-2-vinylnaphthalene, 3-butyl-1-vinylnaphthalene, 4-propylstyrene, 4-(p-tolyl)styrene, 4-(4-phenyl-n-butyl)styrene, 3-(3-pentylphenyl)styrene, 6-isopropyl-1-vinylnaphthalene, 3-p-tolyl-1-vinylnaphthalene, and

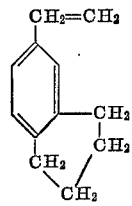

The organolithium compounds suitable for use in the process for the preparation of the block copolymers include those compounds of a formula RLi where R is a monovalent hydrocarbon radical of 1 to 30 inclusive carbon atoms. Illustrative of the RLi compounds suitable for use herein, include, methyllithium, ethyllithium, n-propyllithium, isopropyllithium, n-butyllithium, n-hexyllithium, octadecyllithium, $CH_3(CH_2)_{29}Li$, naphthyllithium, anthracyllithium, benzyllithium, phenyllithium, tolyllithium, xylyllithium, n-decyllithium, cyclohexyllithium, 4-butylphenyllithium, 4-cyclohexylbutyllithium, 4-phenylbutyllithium and octyllithium.

The organolithium compounds, the vinyl aromatic compounds, and the organic solvents should be dried, washed and/or distilled prior to use to remove any impurities such as water, inhibitors and the like. Suitable organic solvents include the hydrocarbon solvents which are solvents for the vinyl aromatic compounds such as cyclohexane, toluene, benzene, n-hexane, mineral spirits, methylcyclohexane, xylene, n-butane, n-heptane, isooctane and cyclopentane.

Since the organolithium compound, RLi, reacts with the vinyl aromatic compound $GR'C=CH_2$ according to the following Equation I:

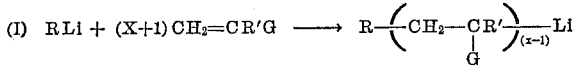

R, R' and G can be illustrated by the following examples.

R is a monovalent hydrocarbon radical having 1 to 30 inclusive carbon atoms, examples of which include, methyl, ethyl, n-propyl, isopropyl, n-butyl, amyl, n-hexyl, octadecyl, triacontyl, naphthyl, anthracyl, benzyl, phenyl, tolyl, xylyl, n-decyl, cyclohexyl, 4-butylphenyl, 4-cyclohexylbutyl, 4-phenylbutyl and octyl.

R' is either a hydrogen atom or a methyl radical.

G is a monovalent aromatic radical which contains 1, 2 or 3 benzenoid rings. The benzenoid rings have up to three aliphatic organic substituents each having no more than six carbon atoms per substituent. Any substituent of the monovalent aromatic radical which is in the ortho position to the

contains no more than one carbon atom per substituent. Examples of G include,

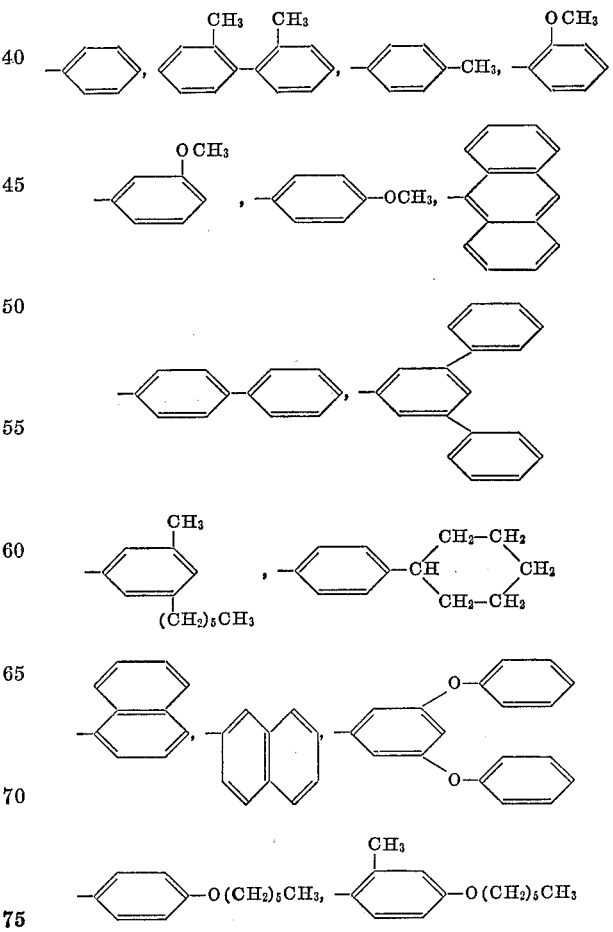

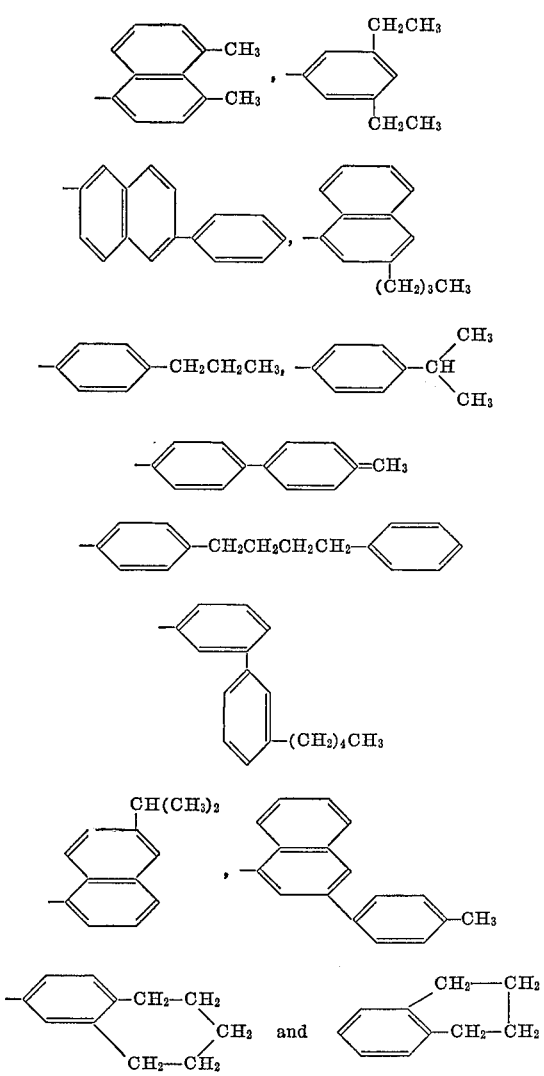

The amount of the organolithium compound used can be readily approximated by dividing the weight of the vinyl aromatic compound to be used by the molecular weight of the organic block desired. The results provide the number of moles of organolithium compound which is to be used. Since the reaction goes to almost 100% conversion and if the undesirable impurities have been carefully removed, the number average molecular weight obtained will be very close to the desired molecular weight used in determining the number of moles of organolithium compound to be used. It is to be understood that some combinations of organolithium compounds and vinyl aromatic compounds as well as certain conditions will deviate somewhat in the results from those calculated, since the percent conversion can vary. It is also to be understood that mixtures of the vinyl aromatic compounds can be polymerized or one vinyl aromatic compound can be polymerized and then another vinyl aromatic compound can be added and polymerized.

The organic solvent for the solution of the hexamethylcyclotrisiloxane can be any of those stated above for use during the polymerization of the vinyl aromatic compound. The polymerization promoter can be, for example, dimethylsulfoxide, tetrahydrofuran and bis(2-methoxyethyl)ether.

The $Zr_2{}^2SiCl$ compounds can be any of the monochlorosilanes where each $R^2$ and Z is a monovalent hydrocarbon radical having 1 to 18 inclusive carbon atoms such as methyl, ethyl, vinyl, allyl, cyclohexyl, phenyl, xenyl, tolyl, octadecyl, naphthyl, isopropyl, butyl, hexyl, decyl, beta-phenylethyl and the like.

The block copolymers suitable for use in preparing the blends of the present invention have a formula

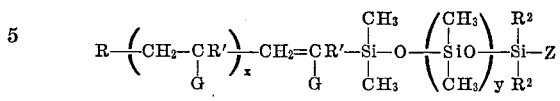

in which R, R', $R^2$, G $x$ and $y$ are defined above. The block copolymers preferably have a molecular weight of from 20,000 to 500,000, but molecular weights from 7,000 to 1,000,000 can be used in preparing the blends of this invention.

A great deal of difficulty is encountered when a vinyl aromatic polymer, such as polystyrene, and polydimethylsiloxane are attempted to be mixed for some use, since these two homopolymers are completely incompatible. Even when one uses a common solvent, such as toluene which dissolved both homopolymers, the resulting mixture is two phase, for example, a toluene-polystyrene phase and a toluene-polydimethylsiloxane phase. The block copolymers of polystyrene and siloxanes made in the past have had unusually large amounts of one or both of the homopolymers in the copolymer mixture. Since the homopolymers are so incompatible, the use of such copolymers usually provides the same disadvantages as a mixture of the homopolymers.

The block copolymers described herein are exceptionally pure and rarely have more than 5 weight percent of either of the homopolymers in the block copolymer mixture and usually the amount of homopolymers is less than 2 weight percent. These block copolymers of the present invention also have narrow molecular weight distribution.

The block copolymers of the present invention have unique solubility properties. These block copolymers are soluble in toluene and provide clear solutions. Whereas equivalent concentrations of the homopolymers are completely immiscible in toluene. Solutions of these block copolymers which are in solvents which are good solvents for only one block remain clear and no precipitate or phase separation is observed.

The polydiorganosiloxane gum suitable for use in the blends of the present invention are for the most part polydimethylsiloxane gums. The polydiorganosiloxane gums can be represented by an average unit formula

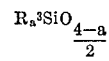

where each $R_3$ is a methyl radical, a vinyl radical, a phenyl radical, an ethyl radical or a 3,3,3-trifluoropropyl radical and $a$ has an average value of 1.98 to 2.005 inclusive. Since the polydiorganosiloxane gums are essentially polydimethylsiloxane gums, at least 90 percent of the total $R_3$ groups are methyl radicals and the remaining $R_3$ groups are vinyl, phenyl, ethyl of 3,3,3-trifluoropropyl. Small amounts of other groups can be present such as 1 or 2 percent of the total $R_3$, where such groups are other monovalent hydrocarbon groups, such as propyl, butyl, hexyl cyclohexyl, beta-phenylethyl, octadecyl and the like; other halogenated monovalent hydrocarbon radicals, such as, chloromethyl, bromophenyl, α,α,α-trifluorotolyl, perfluoroheptylethyl, dichlorophenyl and the like; cyanoalkyl; alkoxyl, such as, methoxy, propoxy, ethoxy, hexoxy and the like; ketoxime; halogen; and acyloxy. The groups which are present in small amounts are considered as incidental and not producing any significant characteristic changes of the polydimethylsiloxane gum.

The polydiorganosiloxane gums suitable for the blends of the present invention are essentially composed of dimethylsiloxane units with the other units being represented by monomethylsiloxane, trimethylsiloxane, methylvinylsiloxane, methylethylsiloxane, diethylsiloxane, methylphenylsiloxane, diphenylsiloxane, ethylphenylsiloxane, vinylethylsiloxane, phenylvinylsiloxane, 3,3,3 - trifluoropropylmethylsiloxane, dimethylphenylsiloxane, methylphenylvinylsiloxane, dimethylethylsiloxane, 3,3,3-trifluoropropyldimethylsiloxane, mono - 3,3,3 - trifluoropropylsiloxane, monophenylsiloxane, monovinylsiloxane and the like.

The polydiorganosiloxane gums are well known in the art and can be obtained commercially, and are considered to be soluble polydiorganosiloxanes which have viscosities greater than 1,000,000 cs. at 25° C., preferably greater than 5,000,000 cs. at 25° C.

The blends of the present invention can be made in several ways. The best method of preparing the blends is to solubilize the block copolymer in methylene chloride, add hexamethyldisiloxane or octamethyltrisiloxane to the methylenechloride-block copolymer mixture and then remove the methylenechloride under reduced pressure below 40° C. leaving a solution of the block copolymer in hexamethyldisiloxane or octamethyltrisiloxane. This block copolymer solution is then slowly added in portions to the polydiorganosiloxane gum which is on a heated rubber mill, at 50° C. to 100° C. The amounts of block copolymer added is from 15 to 150 parts by weight per 100 parts by weight polydiorganosiloxane gum. Preferably, the amount of block copolymer added is from 30 to 125 parts by weight per 100 parts by weight of the polydiorganosiloxane gum. The hexamethyldisiloxane or octamethyltrisiloxane is allowed to evaporate after the addition of each block copolymer solution portion. The resulting blend is a uniform mixture.

The blends of the present invention can also be made by using other solvents, such as toluene, cyclohexane, xylene, benzene and the like. In these cases the block copolymer is directly dissolved in the solvent without first dissolving it in methylene chloride. Suitable blends can also be made by mixing the block copolymer and the polydiorganosiloxane gum directly on the rubber mill without any solvent.

The blends of the present invention are curable to useful elastomers with the conventional curing agents for polydiorganosiloxane gums, such as the organic peroxides, such as, benzoyl peroxide, di-tertiary-butyl peroxide, tertiary-butyl-triethylmethyl peroxide, 2,5 - bis(tertiary-butylperoxy)-2,5 - dimethylhexane, tertiary-butyl-tertiary-triptyl peroxide, tertiary butyl perbenzoate, 1,4-dichlorobenzoyl peroxide, 2,4-dichlorobenzoyl peroxide, monochlorobenzoyl peroxide, dicumyl peroxide and the like.

Fillers conventionally used in silicone rubber can also be added to the blends of the present invention to provide added reinforcement or to reduce the cost per pound. Such fillers include, silica, treated silicas, titanium dioxide, zinc oxide, quartz, kaolin, calcium carbonate, carbon black, diatomaceous earth, and the like. Other conventional silicone rubber additives can also be used such as heat stabilizers, antioxidants, plasticizers, and the like.

The blends of the present invention are useful in making elastomers. The blends cure to elastomers and can be used where elastomers are used such as in molded articles, wire coatings, electrical insulation, tapes and gaskets, to name a few uses.

The blends have improved electrical properties over silicone rubber and low density in the cured state. The blends of the present invention also do not crepe harden as do mixtures of polydiorganosiloxane gums and reinforcing fillers. Whereas vinyl aromatic polymers are very difficult to disperse or mix adequately with polydiorganosiloxane gums, the block copolymers of the present invention are readily dispersible and also additional vinyl aromatic homopolymers can be readily blended with the blends of this invention.

The following examples are illustrative only and should not be construed as limiting the present invention which is properly delineated in the appended claims.

EXAMPLE 1

The quantities and results of this example are tabulated in Table I.

Freshly distilled styrene, which was washed with dilute sodium hydroxide to remove any inhibitors and dried before distillation, in cyclohexane was refluxed for 15 minutes under a slow purge of pure nitrogen. The styrene was further dried by refluxing the solution over calcium hydride for 30 minutes. The styrene solution dried in this manner was then transferred to a reactor, which had been previously purged with pure nitrogen and under a slight nitrogen pressure without exposure to the atmosphere. The polymerization of the styrene is initiated by adding a 1.6 molar solution of butyllithium in hexane. The reactor was cooled during the initial stages of the polymerization. After 3 to 4 hours at room temperature, the polymerization of styrene was complete.

A solution of $\{(CH_3)_2SiO\}_3$ in cyclohexane was refluxed for 15 minutes under a slow nitrogen purge and then dried by refluxing over calcium hydride for 30 minutes. A portion of the dried solution of $\{(CH_3)_2SiO\}_3$ was then added to the reactor containing the polymerized styrene without exposure of either solution to the atmosphere. After about one hour of agitation at 50° C. to 60° C. the orangish color characteristic of the lithium ended polystyrene completely disappeared. The remaining dried solution of $\{(CH_3)_2SiO\}_3$ was added and then tetrahydrofuran was added. The resulting reaction mixture was then agitated and refluxed for 4 hours, at which time the original cloudy solution cleared. The resulting product was then neutralized with 1.0 ml. of dimethylvinylchlorosilane followed by 1.0 g. of sodium bicarbonate to provide a dimethylvinylsiloxy terminated block copolymer or with 1.0 ml. of acetic acid followed by 1.0 g. of sodium bicarbonate to give a silanol terminated block copolymer. The product solutions were washed with water and precipitated with methanol. The precipitates were washed several times with methanol and then the residual solvent was removed by heating at 50° C. and 0.1 mm. of Hg for 19 hours. The product was a block copolymer represented by the formula

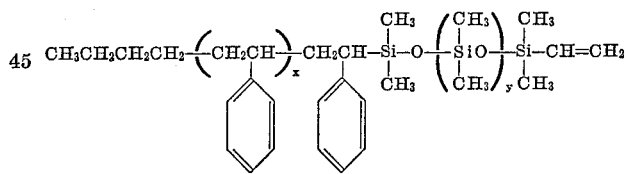

in the case of the dimethylvinylsiloxy terminated block copolymer and

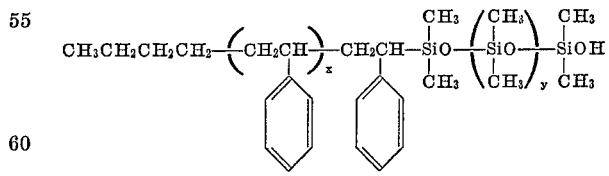

in the case of the silanol terminated block copolymer. The values of $x$ and $y$ are dependent upon the molecular weights and the weight percentages of each block.

The procedure was varied in Run No. 12 as follows: The mixture after the addition of the dimethylsulfoxide was refluxed for one hour and then allowed to stand for 48 hours before neutralizing with 1.0 g. of Dry Ice. The block copolymer was precipitated by distilling 200 ml. of the solvent and adding methanol. The infrared analysis was consistent with the structure and the block copolymer formed a single solution phase in carbon tetrachloride whereas a mixture of polystyrene and polydimethylsiloxane formed a two phase system in carbon tetrachloride.

TABLE I

| Run No. | Styrene, grams | Ml. cyclohexane styrene dissolved in | Moles n-butyl-lithium | Total {(CH₃)₂SiO}₃ grams | Ml. cyclohexane {(CH₃)₂SiO}₃ dissolved in | Ml. cyclohexane {(CH₃)₂SiO}₃ solution, first addition | Ml. tetra-hydrofuran |
|---|---|---|---|---|---|---|---|
| 1 | 140 | 466 | 0.0280 | 60 | 159 | 50 | 120 |
| 2 | 140 | 466 | 0.0070 | 60 | 159 | 60 | 120 |
| 3 | 104 | 400 | 0.0054 | 166.6 | 400 | 50 | 250 |
| 4 | 90 | 288 | 0.0030 | 67 | 192 | 55 | 120 |
| 5 | 90 | 288 | 0.0030 | 67 | 192 | 40 | 120 |
| 6 | 90 | 288 | 0.0030 | 67 | 192 | 55 | 120 |
| 7 | 80 | 275 | 0.0026 | 120 | 350 | 100 | 120 |
| 8 | 80 | 275 | 0.0026 | 120 | 350 | 100 | 120 |
| 9 | 20 | 95 | 0.00064 | 30 | 95 | 50 | 60 |
| 10 | 80 | ¹400 | 0.0010 | 168 | ¹672 | 100 | ²20 |
| 11 | 140 | 400 | 0.00133 | 60 | 200 | 40 | 10 |
| 12 | 69.4 | 350 | 0.0064 | 50 | 75 | 10 | ³2 |
| 13 | 70 | 350 | 0.0014 | 130 | 950 | 100 | 120 |
| 14 | 50 | ¹200 | 0.0015 | 127 | ¹804 | 50 | ³25 |
| 15 | 60 | ¹300 | 0.0014 | 130 | ¹656 | 100 | ³25 |

| Run No. | Yield of block copolymer recovered, percent | Number average molecular weight of block copolymer ⁴ | Terminating group | Weight percent of siloxane block | Approximate value of x | Approximate value of y |
|---|---|---|---|---|---|---|
| 1 | 96.0 | 7,060 | —Si(CH₃)₂CH=CH₂ | 28.4 | 25 | 47 |
| 2 | 84.0 | 30,600 | —Si(CH₃)₂CH=CH₂ | 29.1 | 118 | 207 |
| 3 | 84.0 | 48,800 | —Si(CH₃)₂OH | 61.6 | 404 | 179 |
| 4 | 78.0 | 47,600 | —Si(CH₃)₂CH=CH₂ | 32.0 | 204 | 310 |
| 5 | 80.0 | 41,400 | —Si(CH₃)₂CH=CH₂ | 33.0 | 182 | 265 |
| 6 | 94.0 | 65,400 | —Si(CH₃)₂OH | 36.9 | 324 | 395 |
| 7 | 91.0 | 80,000 | —Si(CH₃)₂OH | 58.7 | 632 | 316 |
| 8 | 91.0 | 80,000 | —Si(CH₃)₂CH=CH₂ | 58.7 | 632 | 316 |
| 9 | 82.8 | 72,600 | —Si(CH₃)₂OH | | | |
| 10 | 80.0 | 170,000 | —Si(CH₃)₂CH=CH₂ | 53.6 | 1,229 | 757 |
| 11 | 84.0 | 129,000 | —Si(CH₃)₂CH=CH₂ | 27.4 | 475 | 899 |
| 12 | | | —Si(CH₃)₂OH | | | |
| 13 | | 44,200 | —Si(CH₃)₂CH=CH₂ | 26.8 | 310 | 158 |
| 14 | | 140,227 | —Si(CH₃)₂CH=CH₂ | 58.2 | 562 | 1,101 |
| 15 | 82.0 | 169,300 | —Si(CH₃)₂CH=CH₂ ⁵ | 60 | 651 | 1,370 |

¹ Benzene used in place of the cyclohexane.
² Bis-(2-methoxyethyl)ether used in place of the tetrahydrofuran.
³ Dimethylsulfoxide used in place of the tetrahydrofuran.
⁴ Determined by membrane osmometry.

$$\begin{array}{c} CH=CH_2 \\ | \end{array}$$

⁵ 5 g. (CH₃SiO)₃ added after {(CH₃)₂SiO}₃ was 85% consumed.

EXAMPLE 2

Solutions were prepared as follows: The block copolymers as identified in Table II were dissolved in methylene chloride. To the methylene chloride-block copolymer solution, hexamethyldisiloxane was added. The methylene chloride was then stripped from the resulting solution under vacuum and below 40° C. until gas-liquid chromatographic analysis showed that there was no methylene chloride remaining in the block copolymer-hexamethyldisiloxane solution. The ratio of the ingredients were one gram of block copolymer for 10 ml. of methylene chloride and 10 ml. of hexamethyldisiloxane. The total amount of solution was determined by the amount of block copolymer used.

A two roll rubber mill was heated to 100° C. prior to placing on the heated mill 100 parts by weight of a polydimethylsiloxane gum having 0.142 mole percent methylvinylsiloxane units and a Williams plasticity of 0.059 in. To the milling gum on the heated two roll mill, 5 ml. portions of the block copolymer-hexamethyldisiloxane solution was added. The hexamethyldisiloxane was allowed to evaporate before the next 5 ml. of solution was added. After all the block copolymer solution was added as indicated in Table II, the blend was milled until no solvent vapors could be detected.

The mill was then cooled to room temperature before adding 0.5 part by weight of tertiary butyl perbenzoate based on 100 parts by weight of the gum. The tertiary butyl perbenzoate was thoroughly mixed into the cooled blend. Each blend was then cured at 15° C. for 10 minutes in a 22-ton press to give a cured elastomer of 3 in. by 8 in. by 0.061 in. The cured elastomers were not tested for physical properties until at least 24 hours after the cure. The physical properties are shown in Table II. Those physical properties determined were tensile strength at break (ASTM–D–412–66), elongation at break (ASTM–D–412–66), modulus at 50% elongation, at 100% elongation, at 150% elongation and 200% elongation (ASTM–D–412–66), durometer on the Shore A Scale (ASTM–D–2240–64T), Bashore resilence (ASTM–D–2632), die "B" tear strength (ASTM–D–624–54), and tension set (ASTM–D–412–66) wherein the tension set was obtained at break measured one minute after rupture.

TABLE II

| Block copolymer used, Run No. example 1 | Parts by weight block copolymer per 100 parts by weight gum | Parts by weight styrene per 100 parts polydi-methyl-siloxane | Tensile strength at break, p.s.i. | Elongation, at break, percent | Modulus, p.s.i. at elongation 50% | 100% | 150% | 200% | Durometer, Shore A, scale | Bashore resilience, percent rebound | Die "B" tear strength, p.p.i. | Tension set, percent |
|---|---|---|---|---|---|---|---|---|---|---|---|---|
| 5 | 50 | 32.6 | 432 | 165 | 252 | 340 | | | 70 | 41 | 69 | 5 |
| 2 | 71.5 | 47 | 441 | 160 | 250 | 348 | 435 | | 66 | 45 | 66 | 0 |
| 2 | 35.8 | 25.4 | 203 | 157 | 93 | 145 | 200 | | 40 | 72 | 28.5 | 0 |
| 2 | 17.9 | 13.2 | 122 | 157 | 57 | 88 | 115 | | 30 | 76 | 16 | 0 |
| Control | 0.0 | 0.0 | 45 | 103 | | | | | 16 | 73 | 5.5 | 0 |
| 1 | 85.7 | 55.3 | 137 | 27 | | | | | 60 | 47 | 30 | 0 |
| 1 | 42.9 | 30.2 | 130 | 125 | 105 | 125 | | | 39 | 62 | 13 | 0 |
| 1 | 21.4 | 15.7 | 95 | 137 | 60 | 80 | | | 31 | 72 | 11.5 | 0 |
| 13 | 125 | | 760 | 273 | 403 | 477 | 550 | 673 | 78 | 28 | 116 | 27 |
| 13 | 62.5 | | 415 | 290 | 122 | 168 | 222 | 280 | 50 | 39 | 37.5 | 5 |
| 13 | 31.3 | | 165 | 255 | 45 | 70 | 90 | 120 | 27 | 74 | 12 | 0 |
| 11 | 100 | 57.7 | 673 | 50 | 673 | | | | 95 | 27 | 112 | 4 |
| 11 | 50 | 32 | 700 | 213 | 447 | 523 | 633 | | 88 | 29 | 107 | 23 |
| 11 | 25 | 17 | 251 | 200 | 117 | 165 | 208 | 251 | 50 | 41 | 36 | 2 |
| 11 ¹ | 45.5 | 29.4 | 470 | 210 | 265 | 325 | 390 | 455 | 75 | 26 | 89.5 | 7 |

¹ The polydimethylsiloxane gum was also dissolved in hexamethyldisiloxane before blending.

EXAMPLE 3

Block copolymer solutions were prepared by dissolving a block copolymer as indicated in Table III in toluene. Each solution was made with the ratio of block copolymer to toluene of one gram to 10 ml. The total amount of solution was determined by the amount of block copolymer used. The same procedure of blending was used as described in Example 2, except the toluene-block copolymer solutions were used instead of the hexamethyldisiloxane-block copolymer solutions. The physical properties of the cured elastomers are shown in Table III as determined by the methods described in Example 2.

siloxane gum on a three roll mill at room temperature without using any solvents.

(E) The block copolymer of Example 1, Run No. 2 was blended with the polydimethylsiloxane gum on a two roll mill heated at 121° C. without using any solvents.

(F) The block copolymer of Example 1, Run No. 1 was blended with the polydimethylsiloxane gum on a two roll mill heated at 103.5° C. without using any solvents.

The blending and testing was carried out in the manner described in Example 2. The results are shown in Table IV.

TABLE IV

| Block copolymer used | Parts by weight block copolymer per 100 parts by weight gum | Parts by weight styrene per 100 parts polydimethylsiloxane | Tensile strength at break, p.s.i. | Elongation, at break, percent | Modulus, p.s.i. at elongation | | | | Durometer, Shore A scale | Bashore resilience, percent rebound | Die "B" tear strength, p.p.i. | Tension set, percent |
|---|---|---|---|---|---|---|---|---|---|---|---|---|
| | | | | | 50% | 100% | 150% | 200% | | | | |
| A | 50 | 33 | 600 | 220 | 365 | 440 | 525 | | 80 | 31 | 97 | 20 |
| B | 50 | 32.6 | 420 | 200 | 147 | 237 | 335 | | 52 | 57 | 39 | 0 |
| C | 50 | 32.6 | 235 | 105 | 142 | 225 | | | 45 | 57 | 30 | 0 |
| D | 62.5 | | 260 | 215 | 83 | 125 | 175 | 233 | 35 | 54 | 20 | 0 |
| E | 35.8 | 25.4 | 168 | 133 | 93 | 143 | | | 33 | 60 | 19 | 0 |
| F | 42.9 | 30.2 | 152 | 150 | 112 | 133 | 152 | | 40 | 63 | 15.5 | 0 |
| Control | 0.0 | 0.0 | 45 | 103 | | | | | 16 | 73 | 5.5 | 0 |

EXAMPLE 5

When any of the following block copolymers are substituted for the block copolymer of Example 1, Run No. 11 and blended with the polydimethylsiloxane gum as described in Example 2, equivalent results are obtained.

TABLE III

| Block copolymer used, Run No. Example 1 | Parts by weight block copolymer per 100 parts by weight gum | Parts by weight styrene per 100 parts polydimethylsiloxane | Tensile strength at break, p.s.i. | Elongation at break, percent | Modulus, p.s.i. at elongation | | | | Durometer, Shore A scale | Bashore resilience, percent rebound | Die "B" tear strength, p.p.i. | Tension set, percent |
|---|---|---|---|---|---|---|---|---|---|---|---|---|
| | | | | | 50% | 100% | 150% | 200% | | | | |
| 4 | 50 | 33 | 340 | 175 | 127 | 217 | 310 | | 45 | 61 | 30 | 5 |
| 5 | 50 | 32.6 | 435 | 195 | 120 | 200 | 315 | | 42 | 68 | 27 | 0 |
| 5 | 127 | 65.7 | 322 | 180 | 163 | 245 | 305 | | 50 | 45 | 34 | 0 |
| 6 | 50 | 30.8 | 300 | 280 | 73 | 117 | 175 | 220 | 35 | 61 | 17 | 0 |
| 6 | 30 | 19.8 | 165 | 200 | 58 | 90 | 120 | 165 | 29 | 69 | 12 | 0 |
| 2 | 71.5 | 47 | 525 | 190 | 232 | 353 | 465 | | 61 | 52 | 45 | 0 |
| 2 | 35.8 | 25.4 | 297 | 213 | 92 | 141 | 210 | 281 | 37 | 71 | 21 | 0 |
| 2 | 17.9 | 13.2 | 141 | 207 | 50 | 78 | 105 | | 25 | 67 | 14 | 0 |
| 1 | 85.7 | 55.3 | 113 | 60 | 113 | | | | 60 | 45 | 27 | 0 |
| 1 | 42.9 | 30.2 | 127 | 193 | 80 | 103 | 117 | | 38 | 67 | 17.5 | 0 |
| 1 | 21.4 | 15.7 | 103 | 180 | 50 | 70 | 93 | | 26 | 69 | 12 | 0 |
| 13 | 125 | | 347 | 193 | 68 | 113 | 217 | | 32 | 64 | 16 | 0 |
| 13 | 62.5 | | 185 | 170 | 53 | 93 | 147 | | 28 | 71 | 13 | 0 |
| 13 | 31.3 | | 117 | 177 | 40 | 70 | 95 | | 24 | 78 | 11.5 | 0 |
| 11 | 100 | 57.7 | 408 | 30 | | | | | 73 | 27 | 47 | 2 |
| 11 | 50 | 32 | 320 | 127 | 177 | 263 | | | 62 | 45 | 46.5 | 2 |
| 11 | 25 | 17 | 167 | 177 | 75 | 110 | 152 | | 36 | 66 | 16.5 | 1 |
| Control | 0.0 | 0.0 | 45 | 103 | | | | | 16 | 73 | 5.5 | 0 |

EXAMPLE 4

(A) A solution of the block copolymer of Example 1, Run No. 4, in octamethyltrisiloxane was prepared in the same concentration and manner as described in Example 2 for the hexamethyldisiloxane-block copolymer solution.

(B) Another solution of the block copolymer of Example 1, Run No. 5 in cyclohexane was prepared in the same concentration and manner as described in Example 3 for the toluene-block copolymer solutions.

These two solutions were blended with the polydimethylsiloxane gum as described in Example 2.

The block copolymers of Example 1, Run No. 5(C) and Run No. 13(D) were blended with the polydimethyl-

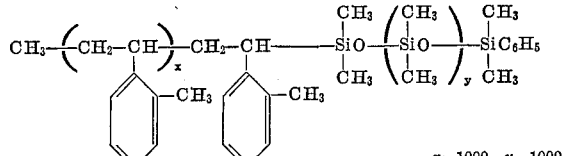

$x=1000, y=1000$

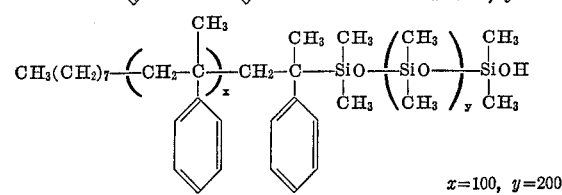

$x=100, y=200$

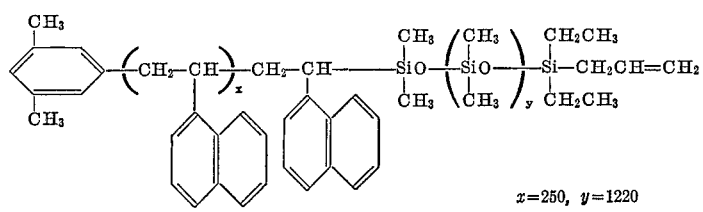

$x=250, y=1220$

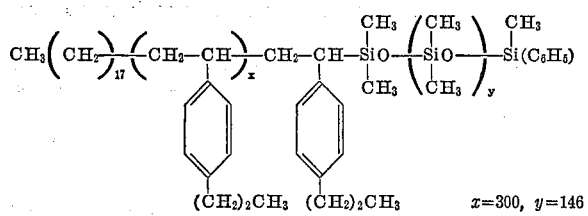

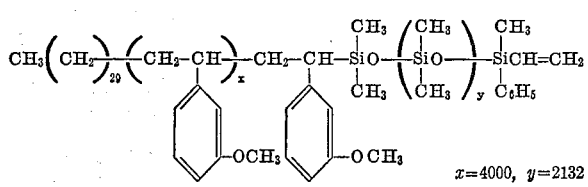

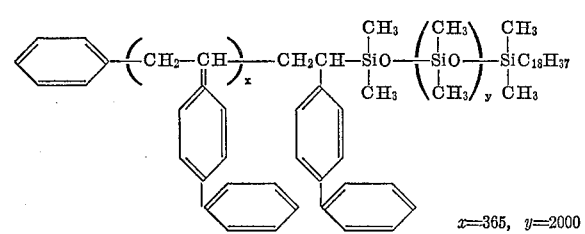

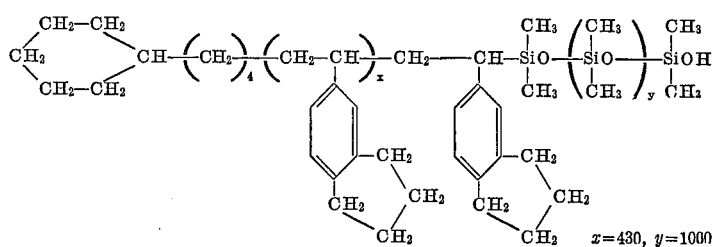

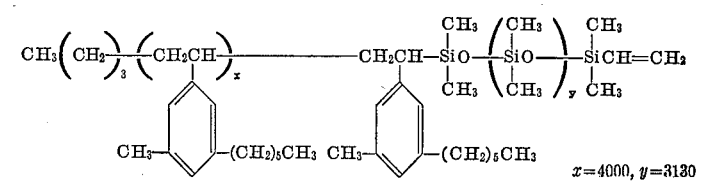

EXAMPLE 6

When any of the following gums are blended with the block copolymer of Example 1, Run No. 11, in the ratio of 50 parts by weight block copolymer to 100 parts by weight of gum by the procedure described in Example 2, the blends cure to elastomers.

(A) A polydiorganosiloxane gum having 95 mol percent dimethylsiloxane units and 5 mol percent phenylmethylsiloxane units, endblocked with hydroxyl radicals, and a viscosity of 1,000,000 cs. at 25° C.

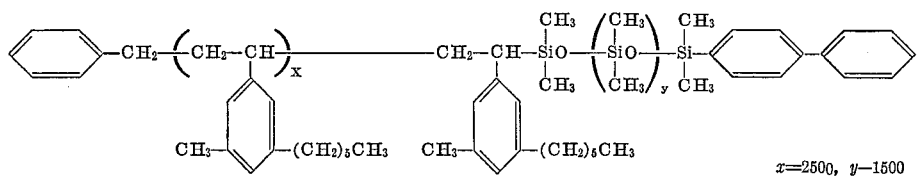

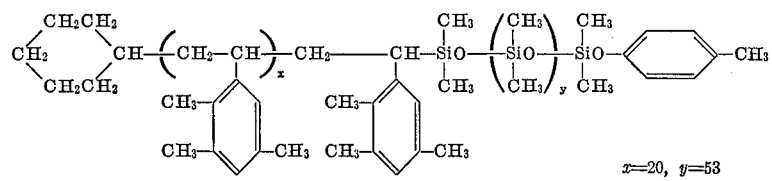

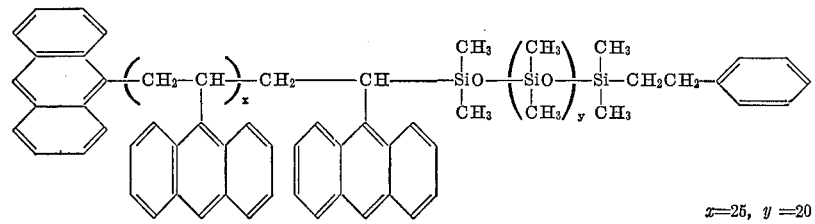

(B) A polydiorganosiloxane gum having 98 mol percent dimethylsiloxane units and 2 mol percent diphenylsiloxane units, endblocked with methylphenylvinylsiloxane units and a viscosity of 10,000,000 cs. at 25° C.

(C) A polyorganosiloxane gum having 90 mol percent dimethylsiloxane units, 5 mol percent ethylmethylsiloxane units and 5 mol percent methylvinylsiloxane units, endblocked with trimethylsiloxane units and a viscosity of 25,000,000 cs. at 25° C.

(D) A polydiorganosiloxane gum having 92 mol percent dimethylsiloxane units and 8 mol percent 3,3,3-trifluoropropylmethylsiloxane units, endblocked with dimethylvinylsiloxane units and a viscosity of 6,000,000 cs. at 25° C.

(E) A polydimethylsiloxane gum endblocked with trimethylsiloxane units and a viscosity of 50,000,000 cs. at 25° C.

EXAMPLE 7

When 150 parts by weight of the block copolymer of Example 1, Run No. 11, is blended with 100 parts by weight of the polydimethylsiloxane gum of Example 2 and the procedure described in Example 2 is followed, an equivalent elastomer is obtained.

That which is claimed is:

1. A blend consisting essentially of (A) 100 parts by weight of a polydiorganosiloxane gum having an average unit formula $$R_a^3 SiO_{\frac{4-a}{2}}$$

wherein each $R^3$ is a monovalent radical selected from the group consisting of a methyl radical, a vinyl radical, a phenyl radical, an ethyl radical and a 3,3,3-trifluoropropyl radical, and $a$ has an average value of from 1.98 to 2.005 inclusive, at least 90 percent of the total $R^3$ groups being methyl radicals, and molecules of said polydiorganosiloxane gum being terminated by a group selected from the group consisting of silanols, alkoxys and $R_3^3SiO_{0.5}$ where $R^3$ is defined above, and (B) 15 to 150 parts by weight of a block copolymer consisting essentially of an aromatic containing organic block and a silicon containing block and represented by a formula

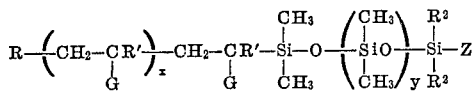

in which

R is a monovalent hydrocarbon radical having from 1 to 30 inclusive carbon atoms, R' is a monovalent radical selected from the group consisting of a hydrogen atom and a methyl radical, each $R^2$ is a monovalent hydrocarbon radical having from 1 to 18 inclusive carbon atoms, Z is a monovalent radical selected from the group consisting of $R^2$ radicals and hydroxyl radicals, G is a monovalent aromatic radical consisting of from 1 to 3 benzenoid rings in which the benzenoid rings have up to 3 aliphatic organic substituents each of no more than six carbon atoms selected from the group consisting of alkyl radicals, cycloalkyl radicals and alkoxy radicals, and in G no aliphatic organic substituent which is ortho to the

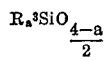

group has more than one carbon atom, $x$ has an average value of from 20 to 5000 inclusive, and $y$ has an average value of from 20 to 5000 inclusive, said block copolymer having a molecular weight of from 7000 to 1,000,000 inclusive, 20 to 70 weight percent being silicon containing units and 30 to 80 weight percent being units of the organic block.

2. The blend in accordance with claim 1 in which some $R^3$ are methyl radicals and any remaining $R^3$ are vinyl radicals.

3. The blend in accordance with claim 1 in which the block copolymer (B) is present in an amount of from 30 to 125 inclusive parts by weight per 100 parts by weight of (A).

4. The blend in accordance with claim 2 in which the block copolymer (B) is present in an amount of from 30 to 125 inclusive parts by weight per 100 parts by weight of (A).

5. The blend in accordance with claim 2 in which the block copolymer (B) has an average molecular weight of from 20,000 to 500,000 inclusive.

6. The blend in accordance with claim 4 in which the block copolymer (B) has an average molecular weight of from 20,000 to 500,000 inclusive.

7. The blend in accordance with claim 1 in which R' is a hydrogen atom and G is a phenyl radical.

8. The blend in accordance with claim 5 in which R' is a hydrogen atom and G is a phenyl radical.

9. The blend in accordance with claim 6 in which R' is a hydrogen atom and G is a phenyl radical.

10. The blend in accordance with claim 1 in which a filler is present.

11. The blend in accordance with claim 9 in which a filler is present.

12. The blend in accordance with claim 1 in the cured elastomeric state.

13. The blend in accordance with claim 4 in the cured elstomeric state.

14. The blend in accordance with claim 8 in the cured elastomeric state.

15. The blend in accordance with claim 9 in the cured elastomeric state.

References Cited

UNITED STATES PATENTS 3,051,684   8/1962   Morton et al.   260—827
3,483,270  12/1969   Bostick         260—827

SAMUEL H. BLECH, Primary Examiner

U.S. Cl. X.R.

260—33.6, 33.8, 37, 41, 47, 93.5, 827